United States Patent
Punde et al.

(10) Patent No.: US 8,397,025 B2
(45) Date of Patent: Mar. 12, 2013

(54) APPARATUS AND METHOD FOR DETERMINING A CACHE LINE IN AN N-WAY SET ASSOCIATIVE CACHE USING HASH FUNCTIONS

(75) Inventors: Maghawan Punde, Pune (IN); Deepak Lala, Fremont, CA (US)

(73) Assignee: LSI Corporation, Milpitas, CA (US)

( * ) Notice: Subject to any disclaimer, the term of this patent is extended or adjusted under 35 U.S.C. 154(b) by 296 days.

(21) Appl. No.: 12/981,486

(22) Filed: Dec. 30, 2010

(65) Prior Publication Data
US 2012/0173844 A1  Jul. 5, 2012

(51) Int. Cl.
*G06F 12/00* (2006.01)

(52) U.S. Cl. ........ 711/128; 711/216; 711/206; 711/108; 707/693; 707/719

(58) Field of Classification Search .................. 711/128, 711/216, 206; 707/693, 719
See application file for complete search history.

(56) References Cited

U.S. PATENT DOCUMENTS

| | | | |
|---|---|---|---|
| 6,260,155 B1 | 7/2001 | Dellacona | |
| 7,627,734 B2 | 12/2009 | Wilson | |
| 7,809,701 B2 * | 10/2010 | Blake | 707/698 |
| 2002/0179341 A1* | 12/2002 | Boyer et al. | 180/6.48 |
| 2004/0117600 A1* | 6/2004 | Bodas et al. | 712/210 |
| 2005/0102465 A1* | 5/2005 | Royer | 711/1 |
| 2008/0126741 A1* | 5/2008 | Triplett | 711/216 |
| 2008/0229056 A1* | 9/2008 | Agarwal et al. | 711/216 |
| 2010/0293332 A1* | 11/2010 | Krishnaprasad et al. | 711/119 |
| 2011/0060876 A1* | 3/2011 | Liu | 711/108 |

* cited by examiner

*Primary Examiner* — Hong Kim
(74) *Attorney, Agent, or Firm* — Prakash Nama; Global IP Services, PLLC

(57) ABSTRACT

A method and apparatus for determining a cache line in an N-way set associative cache are disclosed. In one example embodiment, a key associated with a cache line is obtained. A main hash is generated using a main hash function on the key. An auxiliary hash is generated using an auxiliary hash function on the key. A bucket in a main hash table residing in an external memory is determined using the main hash. An entry in a bucket in an auxiliary hash table residing in an internal memory is determined using the determined bucket and the auxiliary hash. The cache line in the main hash table is determined using the determined entry in the auxiliary hash table.

24 Claims, 3 Drawing Sheets

APPARATUS AND METHOD FOR DETERMINING A CACHE LINE IN AN N-WAY SET ASSOCIATIVE CACHE USING HASH FUNCTIONS

TECHNICAL FIELD

The present invention relates generally to a cache line, and more particularly to determining the cache line in an N-way set associative cache.

BACKGROUND

In a caching scheme, it is sometimes appropriate to assume that the addresses to be accessed are somewhat uniformly spread across the range. Also, for any address, it is possible to determine the information sought that is associated with the address, but it typically takes a while to access the information that corresponds to a particular address. Furthermore, it is sometimes appropriate to assume that once a particular address is accessed, it is likely that the address would be accessed again. In such a scenario, the address could represent a destination to which (or from which) a packet (e.g., a data packet) is to be sent (or received) by a network switch and the information sought might be the port of the network to which the packet must be sent (or from which the packet must be obtained) in order to route the packet properly.

Further, in a computer network, the network switch typically includes a plurality of network ports. The network ports may be classified as input ports and output ports. The network switch receives packets from a number of input ports and forwards the packets to a number of output ports. The network switch determines the output port to which the packet is forwarded dependent on a destination address included in the packet received at one of the input ports.

The network ports to which packets are to be forwarded based on a destination address are stored in a forwarding entry in a forwarding table in the network switch. The forwarding table is searched for the forwarding entry associated with a particular destination address or cache line.

In general, it is not feasible to provide an entry in the forwarding table for each possible destination address accessible through the network switch. For example, for a 48 bit Ethernet destination address, that is, a Media Access Control (MAC) address, $2^{48}$ forwarding entries are required in the forwarding table to store forwarding information for all the possible MAC addresses. Instead, the forwarding table is implemented as a hash table and the number of forwarding entries in the hash table depends on memory resources. A hash function is performed on the destination address to provide a smaller number which is then used to index the hash table. As a result of performing a hash function on the destination address, multiple destination addresses may map to the same index, that is, aliasing may occur.

In the above scenario, it is inefficient to have constantly stalled processing in order to wait for the port to be searched each time when an address is accessed. One way to avoid stalling is to build a simple one-dimensional array that has as many entries as there are possible address values. One could then store the port information for each particular address in the array element that has the same index pointer as the specific address corresponding to the port information stored therein. This way, if one needs to determine the port corresponding to a given address, the address can serve as the index pointer to the array element for the address being accessed.

A problem associated with using the actual address as an index into the array is that the array becomes significantly large as the address range becomes large. Therefore, a large address range requires a huge amount of memory to be allocated to the cache.

An existing approach to reduce the required size of a cache is to use a hashing function to calculate an index in the cache. Although using a hash as an index decreases the amount of memory used, it also introduces problems caused by aliases. Even if the valid flag indicates that the information in the cache line is valid, one cannot be sure that the information pertains to the address being requested or that it pertains instead to an alias of that address. Note that because the likelihood of collisions typically increases as the number of aliases increases, there is a trade-off between cache size and hashing function used. A way to address the problems introduced by churning is to expand the single data cache line associated with a hash into a set of more than one data lines. Such a cache is called an N-way set associative cache, where N is the number of cache lines associated with a single hash. Such an N-way set is sometimes referred to as a bucket. Therefore, by selecting a hash function and the number of lines for each bucket based upon access patterns, a trade-off between size of the cache and the likelihood of a cache miss (and churning caused by the cache miss) can be made when designing an N-way set associative cache.

SUMMARY

In accordance with one aspect of the present invention, a method of determining a cache line in an N-way set associative cache is disclosed. The method includes obtaining a key associated with a cache line, generating a main hash using a main hash function on the key, generating an auxiliary hash using an auxiliary hash function on the key, determining a bucket in a main hash table residing in an external memory using the main hash, determining an entry in a bucket in an auxiliary hash table residing in an internal memory using the determined bucket in the main hash table and the auxiliary hash, and determining the cache line in the main hash table using the determined entry in the auxiliary hash table. In one example embodiment, a key associated with a destination address in a packet is obtained. The destination address is associated with a network port.

Further, determining the cache line in the main hash table using the determined entry in the auxiliary hash table includes determining an associated entry in the main hash table using the determined entry in the auxiliary hash table, and determining the network port using the determined associated entry in the main hash table.

In accordance with another aspect of the present invention, a network switch includes a processor. The processor includes a packet forwarding engine, a memory controller, a table walk system, an internal memory and a control operation system. The network switch further includes a plurality of network ports coupled to the packet forwarding engine and an external memory operatively coupled to the memory controller. The packet forwarding engine obtains a key associated with a destination address in the packet. The destination address is associated with one of the plurality of network ports. The table walk system generates a main hash using a main hash function on the key and an auxiliary hash using an auxiliary hash function on the key. The table walk system determines a bucket in a main hash table residing in the external memory using the main hash. The table walk system determines an entry in a bucket in an auxiliary hash table residing in the internal memory using the determined bucket in the main hash table and the auxiliary hash. The table walk system determines an associated entry in the main hash table using the determined entry in the auxiliary hash table. The table walk system determines the one of the plurality of network ports for forwarding the packet using the determined associated entry in the main hash table.

In accordance with yet another aspect of the present invention, a non-transitory computer-readable storage medium for determining a cache line in an N-way set associative cache has instructions that, when executed by a computing device, causes the computing device to perform the method described above.

The methods, and systems disclosed herein may be implemented in any means for achieving various aspects, and other features will be apparent from the accompanying drawings and from the detailed description that follows.

BRIEF DESCRIPTION OF THE DRAWINGS

Various embodiments are described herein with reference to the drawings, wherein.

The drawings described herein are for illustration purposes only and are not intended to limit the scope of the present invention in any way.

DETAILED DESCRIPTION

A method and apparatus for determining a cache line in an N-way set associative cache is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

The terms "associated entry in a cache" and "cache line" are used interchangeably throughout the document.

Figure 1:
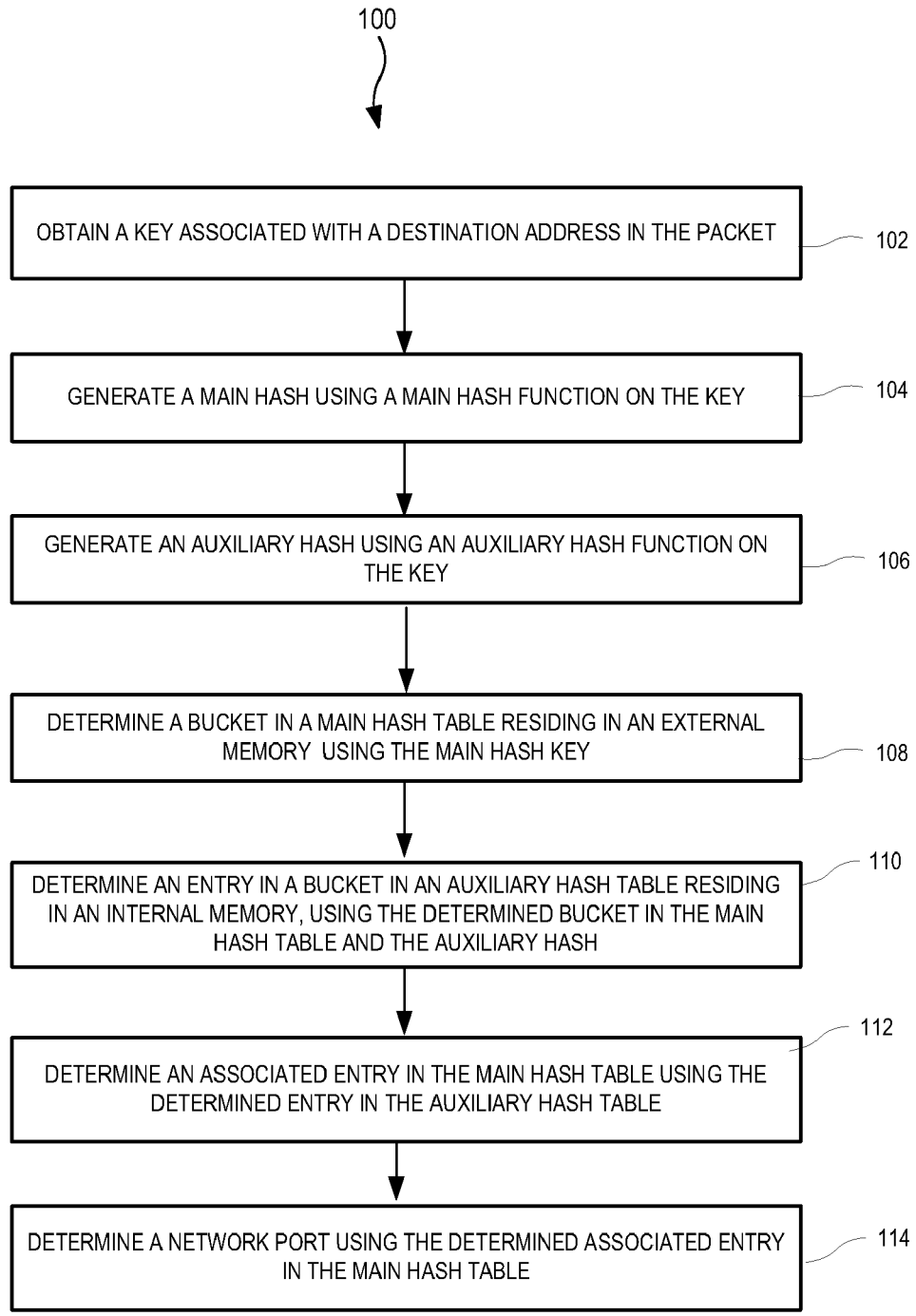
FIG. 1 illustrates a flow diagram for determining a network port for transmission of a packet, according to an embodiment.

FIG. 1 illustrates a flow diagram 100 of an exemplary method for determining a network port for transmission of a packet, according to an embodiment. The packet may be an internet protocol (IP) packet. The packet may consist of control information and a data also referred to as payload. The control information may provide information a network switch may need to deliver the data. The control information may include a source address, a destination address, an error detection code or codes like checksum and sequencing information. In one example embodiment, the control information may be found in the packet headers and trailers, with the data in between. In one example, the headers of the packet may specify the packet type, packet number, total number of packets, and the sender's and receiver's IP addresses. The network switch may pass the packet received from a transmitting station to a destination station based on the control information in the received packet, including the source address and the destination address. Typically a network switch may have a plurality of network ports by which addressed packets may be received and from which addressed packets may be forwarded.

At block 102, a key associated with a destination address in the packet is obtained. In one example embodiment, obtaining the key associated with the destination address in the packet may involve obtaining a key associated with a cache line. The destination address is associated with a network port. The key may be obtained by parsing the destination address in the packet. The destination address may be located in the control information or the header of the packet. At block 104, a main hash is generated using a main hash function on the key. At block 106, an auxiliary hash is generated using an auxiliary hash function on the key. The main hash function and the auxiliary hash function may be specified by a user or a system administrator. The main hash may map to a greater range of hash values than that of the auxiliary hash.

At block 108, a bucket in a main hash table is determined using the main hash. The main hash table may include a plurality of buckets, one bucket for each possible main hash value, and with each such bucket having a plurality of entries. Each entry may contain the key (or an identifier of the key) of the packet and the data associated with the packet. The main hash table entry may be created using the address information from the packet and hashing the address information to create the main hash. The main hash table may be located in an external memory.

At block 110, an entry in a bucket in an auxiliary hash table is determined using the determined bucket in the main hash table and the auxiliary hash. The auxiliary hash table may also include a plurality of buckets, one bucket for each possible main hash value. As was the case with the mail hash table, each of the plurality of such buckets in the auxiliary hash table may include a plurality of entries. The entry in the auxiliary hash table is determined by mapping the determined bucket in the main hash table using the main hash to a corresponding bucket in the auxiliary hash table. The bucket in the auxiliary hash table that corresponds to the main hash is searched for an entry by comparing at least a portion of the contents of all the valid entries in the corresponding bucket in the auxiliary hash table with the auxiliary hash. In one example embodiment, the entry in the bucket in the auxiliary hash table is determined by comparing the auxiliary hash with at least a portion of the contents stored in each valid entry of the bucket in the auxiliary hash table and then determining an entry with the contents of the compared portion matching with the auxiliary hash.

If there is no valid entry in the auxiliary hash table having the compared portion of the contents matching with the auxiliary hash, then a vacant entry in the main hash table in the bucket is determined. Further, the key (or an identifier of the key) is stored in the vacant entry in the main hash table and the auxiliary hash is stored in a corresponding vacant entry in the auxiliary hash table.

Each valid entry in the auxiliary hash table bucket may include an auxiliary hash and a flag. The flag may include a lock status flag and a validity flag. The auxiliary hash table may be located on an internal memory. The internal memory may be a cache memory in a processor in the network switch. The size of the internal memory may be small compared to the external memory. The auxiliary hash table entry may be created using the address information from the packet and hashing the address information to create an auxiliary hash. One skilled in the art can envision that the internal memory can be any memory (residing inside or outside the processor) that can be accessed faster than the external memory. In one embodiment, the cache line in the main hash table is determined using the determined entry in the auxiliary hash table as explained in blocks 112 and 114.

At block 112, an associated entry in the main hash table is determined using the determined entry in the auxiliary hash table. The associated entry may be determined by mapping the entry from the auxiliary hash table to the main hash table. At block 114, the network port is determined using the determined associated entry in the main hash table. The network port is determined by reading the contents of the associated entry in the main hash table.

According to an embodiment, with respect to block 110, it is determined whether the auxiliary hash matches with at least a portion of the content of an entry in the auxiliary hash table. Only the contents of entries in the bucket of the auxiliary hash table corresponding to the identified bucket in the auxiliary hash table are matched with the auxiliary hash. If there is a match in the auxiliary hash and a portion of a valid entry in the auxiliary hash table the method proceeds to block 112. If there is no match is found between the auxiliary hash and the compared portion of an entry in the auxiliary hash table, a vacancy in the main hash bucket associated with the auxiliary hash bucket is determined. Such a vacancy in a bucket represents an entry in the bucket which is not occupied or for which no data exist in the entry. If there is a vacancy in the main bucket, the key (or a identifier associated with the address) and related port number may be stored in the vacancy. The corresponding auxiliary hash may be stored in the auxiliary hash table. If there is no vacancy in the bucket, the method may end without returning a value.

Further with respect to block 110, it is determined whether the auxiliary hash matches with more than one entry in the auxiliary hash table. The auxiliary hash table may contain more than one entry with the same auxiliary hash as more than one destination address may be hashed to a same auxiliary hash. If the auxiliary hash matches with more than one entry, each of the corresponding entries in the main hash table may be accessed to determine whether the entry is for the address of the packet or for an alias of the address. A pseudo code for the method 100 is described in Appendix A of the present disclosure.

Figure 2:
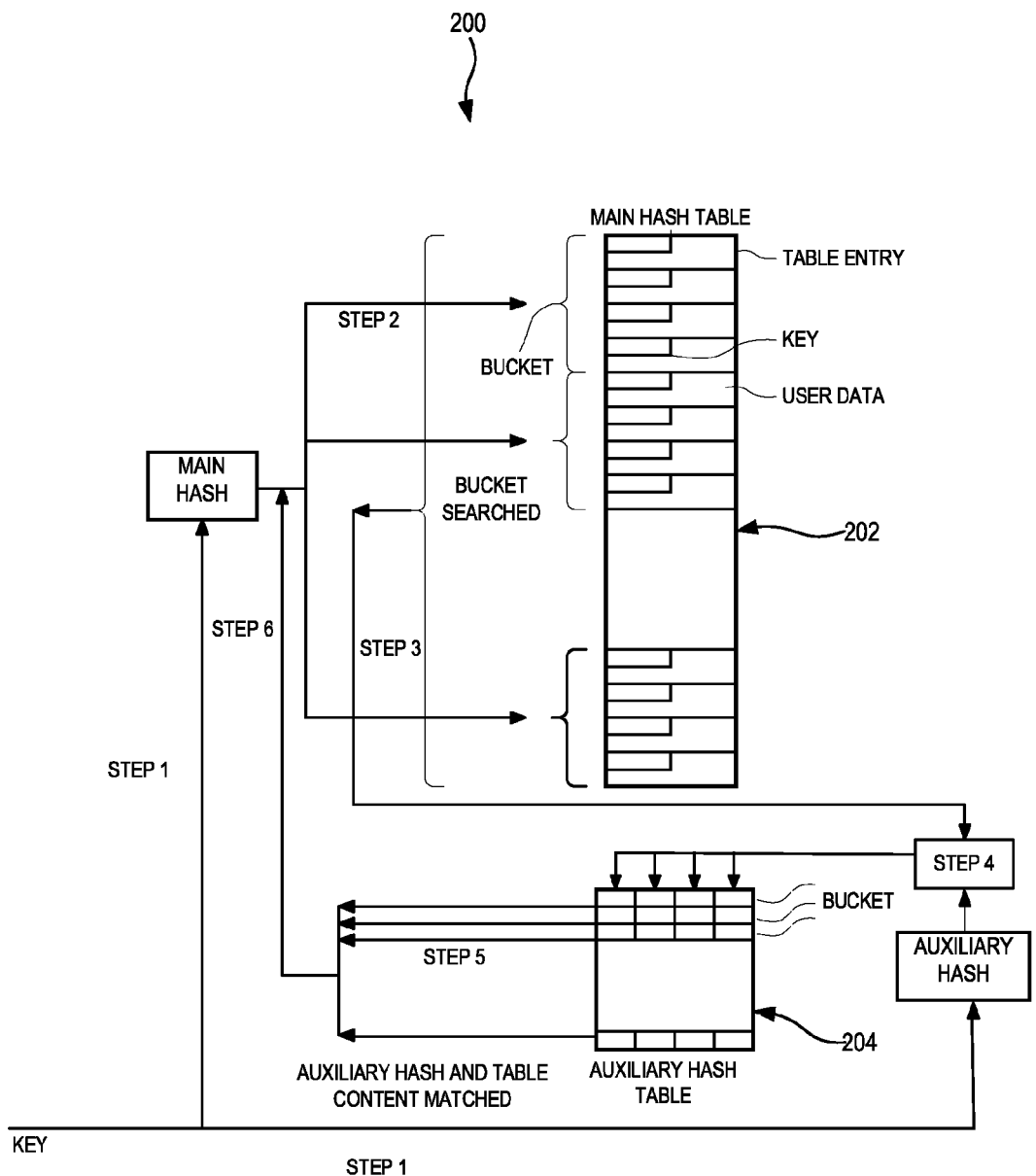
FIG. 2 illustrates an exemplary data structure illustrating a lookup operation using an auxiliary hash table, according to an embodiment.

FIG. 2 shows an exemplary data structure illustrating a lookup operation using the auxiliary hash table (204), according to one embodiment. FIG. 2 provides procedural steps as well as the system data structure arrangement. The main hash table (202) as shown in the FIG. 2 is organized as an array of buckets with each bucket of the array corresponding to a particular main hash value. One bucket in the main hash table (202) may include of a set of four table entries so that the bucket in the main hash (202) can handle up to four collisions. Four is an example, and the number of entries in a bucket in the main hash table (202) may vary based on the needs of a specific implementation. A portion of each entry of the bucket in the main hash table (202) is reserved to store the key (or an identifier associated with the key) and the rest is available for storing the data, such as the port associated with the packet. The auxiliary hash table (204) is also organized as an array of buckets with each bucket of the array corresponding to a particular main hash value. An individual entry in the auxiliary hash table may contain flags indicating 'validity' and 'locked' status of the entry along with the associated auxiliary hash. The auxiliary hash may be a long key hashed to a very small value using any hash function other than one used for the main hash. Typically the key may be of an order of 128 bits and the auxiliary hash may be an order of 4 or 6 bits.

Step 1 (as shown in FIG. 2) depicts key hashing in two steps to obtain the main hash and the auxiliary hash using the main hash function and the auxiliary hash function respectively.

Step 2 (as shown in FIG. 2) refers to a bucket identification of the key provided i.e., identifying the corresponding bucket in the main hash table (202) using the main hash. For example, if the key provided has the value 'a', then the corresponding entries may exist in the bucket with the name of 'vowels'. Thus, the 'vowels' is the corresponding bucket for the key 'a'.

Once the corresponding bucket in the main hash table (202) is identified, a bucket in the auxiliary hash table (204) is also identified. The auxiliary hash and a portion of the content of the valid entries in the corresponding bucket of the auxiliary hash table (204) are compared (step 3 and step 4, as shown in FIG. 2). Further, if a portion of the contents of an entry in the auxiliary hash table (204) and the auxiliary main hash match, then the corresponding table entry in the identified bucket in the main hash table (202) is accessed (steps 5 and 6, as shown in FIG. 2). The contents of the entry in the identified bucket in the main hash table (202) may be used to obtain the network port of the packet.

Figure 3:
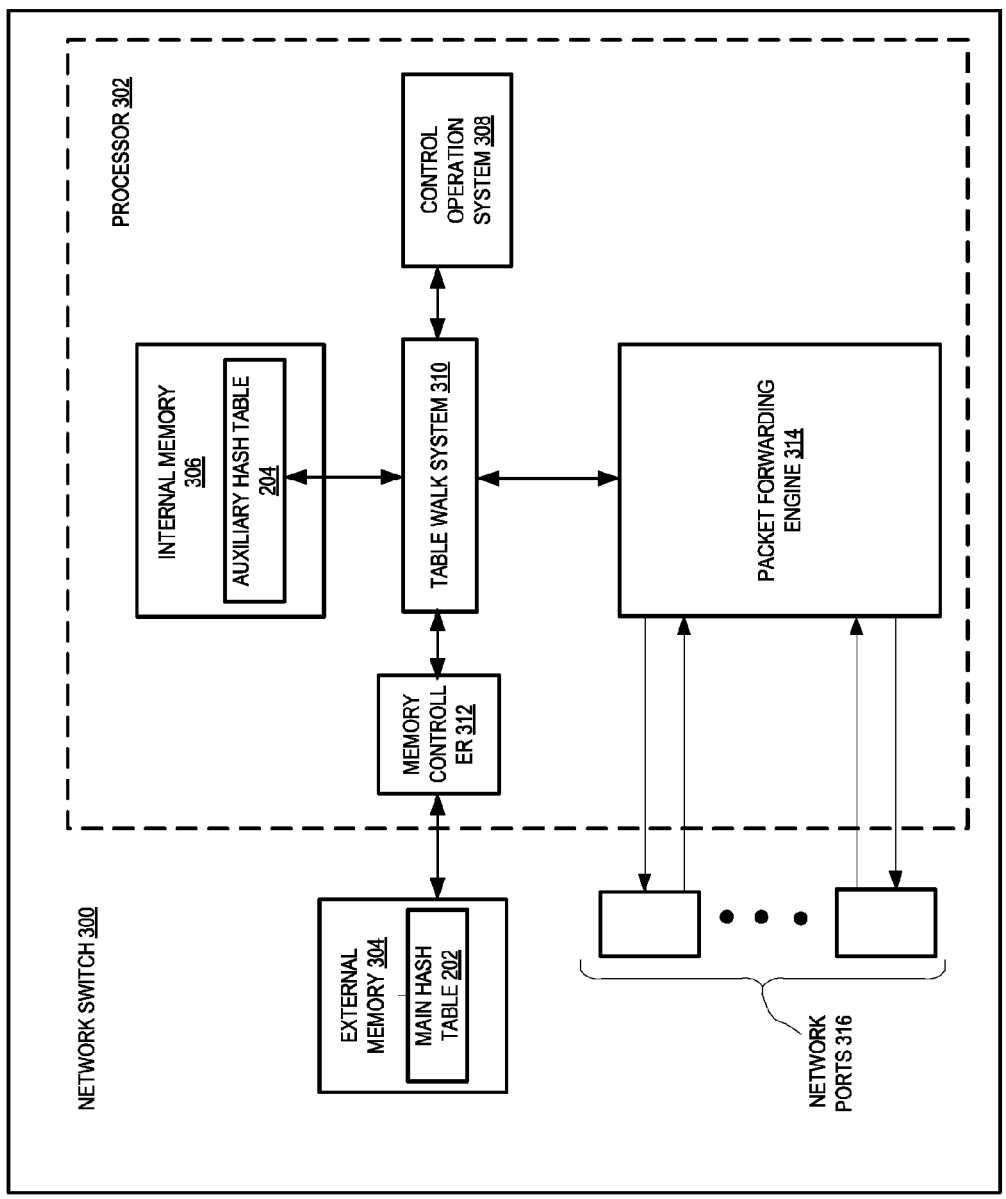
FIG. 3 illustrates a block diagram of a network switch, according to an embodiment.

FIG. 3 illustrates a block diagram of a network switch 300 according to an embodiment. The network switch 300 includes a processor 302, an external memory 304 and plurality of network ports 316. The processor 302 includes an auxiliary hash table (204) for improving performance of the network switch (300). As illustrated, the processor (302) further includes an internal memory (306), a control operation system (308), a table walk system (310), a memory controller (312) and a packet forwarding engine (314). The external memory (304) may be a memory accessible to the processor (302). The internal memory (306) may be a direct accessible local memory. The external memory (304) includes a main hash table (202) and the internal memory (306) includes the auxiliary hash table (204). As illustrated, the table walk system (310) is coupled to the main hash table (202) through the memory controller (312). Also, the table walk system (310) is directly coupled to the auxiliary hash table (204). Further, the control operation system (308) is directly coupled to the table walk system (310). The packet forwarding engine (314) is coupled to the network ports (316) and the table walk system (310). The packet forwarding engine (314) may send and receive packets serially through the network ports (316).

According to an example embodiment, the packet forwarding engine (314) obtains a key associated with a destination address from the received packets. The destination address is associated with one of the network ports (316). The table walk system (310) may generate a main hash using a main hash function on the key and an auxiliary hash using an auxiliary hash function on the key. The table walk system (310) may further determine a bucket in the main hash table (202) residing in the external memory (304) using the main hash. The table walk system determines a bucket in an auxiliary hash table (202) residing in the internal memory (306) using the main hash. The table walk system (310) may further determine an entry in a bucket in the auxiliary hash table (204) residing in the internal memory (306) using the determined bucket in the main hash table (202) and the auxiliary hash. The table walk system (310) may further determine an associated entry in the main hash table (202) using the determined entry in the auxiliary hash table (204). The table walk system (310) may further determine the one of the network ports (316) for forwarding the packet using the determined associated entry in the main hash table (202).

The main hash table (202) is organized as an array of buckets. Each bucket may include a plurality of entries. Each entry of the bucket may be configured to store a key (or identifier associated with the key) and associated data. The auxiliary hash table (204) is also organized as an array of buckets. Each bucket in the auxiliary hash table (204) may include a plurality of entries. Each entry of the bucket in the auxiliary hash table (204) may be configured to store an auxiliary hash corresponding to each hey stored in the buckets of the main hash table (202). The auxiliary hash table (204) may also be configured to store flags indicating validity and status (e.g., locked) associated with each entry in the main hash table (202). In one example embodiment, the main hash table (202) and the auxiliary hash table (204) are indexed using a main hash function. In another embodiment, the main hash is generated by hashing the key using a hash function. Also, the auxiliary hash stored in the auxiliary hash table (204) is generated by hashing the key using a different hash function.

The table walk system (310) is configured for installing new key information or accessing existing entries in the main hash table (202) using the memory controller (312). The control operation system (308) is configured for locking one or more entries for atomic operations and for deleting one or more entries. The network ports (316) are used for sending and receiving the packets at the network switch 302.

According to an embodiment, during a lookup operation, a requested key is hashed to generate a main hash and an auxiliary hash using a main hash function and an auxiliary hash function, respectively. Then, a bucket associated with the key is identified using the main hash in the main hash table (202). Further, the auxiliary hash is compared with content stored in each entry of the bucket in the auxiliary hash table (204) which corresponds to the table entries in the identified bucket in the main hash table (202). If the match is found between the auxiliary hash and the content in one of the entries of the selected bucket in the auxiliary hash table (204), then the main hash table (202) is accessed to obtain the table entry associated with the identified bucket. If no match is found, then it may imply that no table entry exists in the identified bucket of the main hash table (202). Further, it is determined whether there is a vacant entry in the identified bucket. If a vacant entry is found, then the key is installed by writing the key in the vacant entry of the main hash table (202).

Also, the auxiliary hash corresponding to the key is written to a corresponding entry of the bucket in the auxiliary hash table (204) and a valid bit is set. By doing this, only a single write is required for the external memory (304). Thus, bandwidth of the external memory (304) is conserved and performance of the network switch (300) is significantly increased.

Also, the control accesses do not consume any external memory bandwidth as only one read-modify-write cycle is required to the internal memory (306) for performing control operations ("delete", "valid bit", "acquire lock" and "release lock"). It may be noted that the above described lookup operation is performed by the table walk system (310).

In various embodiments, the method and the apparatus described in FIGS. 1 through 3 may be easy to implement using the above mentioned methods. According to an embodiment, the method and the apparatus described in FIGS. 1 through 3 may provide an improved method to significantly reduce the number of memory accesses for determining a network port for transmission of a packet. The method and the apparatus described in FIGS. 1 through 3 also may nullify the need for additional accesses for hash miss, hash insert and hash lock and unlock cases. Furthermore the method and the system described in FIGS. 1 through 3 may conserve the bandwidth associated with the external memory (304) connected to the processor (302).

Although, the above embodiments "auxiliary hash table/cache is described as residing in an internal memory and the main hash table/cache as residing in an external memory, one skilled in the art can envision that the auxiliary hash table/cache can reside in any memory (i.e., internal memory or external memory) as long as the auxiliary hash table/cache can be accessed faster than main hash table/cache residing in the external memory. One skilled in the art can also envision that the information stored in the auxiliary cache can be merely information about what is stored in the main cache. Further, one skilled in the art can also envision that it is not necessary to use the main hash itself to find a bucket in the auxiliary table, one can employ any other technique to find the bucket in the auxiliary table. For example, the main cache may reside in DRAM and the auxiliary cache may reside in SRAM. For another example, the main cache may reside in a hard disk and the auxiliary cache may reside in DRAM. It will be understood that these examples are not limiting, and the present invention can be used in any of the many types of memory known in the art.

One skilled in the art can envision that the information stored in the auxiliary cache will be a design choice that would depend upon the hash function or functions used and the anticipated cache access patterns.

The above described technique uses a main cache to store cached data and an auxiliary cache is used to store information as to what data is stored in the main cache. Before accessing the main cache, the auxiliary cache is accessed to determine whether the information being sought is stored in the main cache. If the auxiliary cache indicates that the information being sought is not stored in the main cache (an auxiliary cache miss), the information being sought is calculated and returned. Then the main cache is updated with the information that was sought and the auxiliary cache is updated to indicate that the information is now available in the main cache. If storing the information in the main cache requires replacing information in a cache line, then the auxiliary cache is also updated to indicate that the information that was discarded from the main cache is no longer available in the main cache.

An article comprising a non transitory computer readable storage medium can have instructions stored thereon which when executed by a computer, will cause the computer to perform the above described method. It will be appreciated that the various embodiments discussed herein may not be the same embodiment, and may be grouped into various other embodiments not explicitly disclosed herein.

Although the present embodiments have been described with reference to specific example embodiments, it will be evident that various modifications and changes may be made to these embodiments without departing from the broader scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structures and methods may be embodied using transistors, logic gates, and electrical circuits, such as an application specific integrated circuit.

APPENDIX A

```
lookup(key)
{
    // Step 1 - compute two hashes in parallel
    bucket_index = main_hash_function(key);
    auxi_hash = auxi_hash_function(key);
    // Step 2 - Walk auxiliary table bucket
    // Walk thru the bucket (we are accessing auxiliary table)
    for(bucket_offset=0; bucket_offset<NO_OF_ENTRIES_IN_BACKET; bucket_offset++)
    {
        // Compare the hash in auxi table
        if ((auxi_hash_table[bucket_index][bucket_offset].valid == true) &&
            (auxi_hash_table[bucket_index][bucket_offset].auxi_hash == auxi_hash))
        {
            // Step 3 - Confirm match in main table; else continue walking the bucket
            // Compare key in main table only if there is match in auxi table
            if (key == main_hash_table[bucket_index ][bucket_offset].key)
                return GET; // Found an entry
        }
    }
    // Step 4 - Install new entry in case there was no match in entire bucket
    // Find an empty entry in the bucket
    // No more reads from main table as valid bit is present in auxi memory
    for(bucket_offset=0;bucket_offset<NO_OF_ENTRIES_IN_BACKET; bucket_offset++)
    {
        if (auxi_hash_table[bucket_index][bucket_offset].valid == false)
        {
            // Writes to main table
            main_hash_table[bucket_index][bucket_offset].key = key;
            // Writes to auxi table
            auxi_hash_table[bucket_index][bucket_offset].valid = true;
            auxi_hash_table[bucket_index][bucket_offset].auxi_hash = auxi_hash;
            return PUT; // Added a new entry
        }
    }
    // Step 5 - Match not found but no place in bucket to add new entry
    return FAIL; // No place to add a new entry
}
```

What is claimed is:

1. A method of determining a cache line in an N-way set associative cache, comprising:
obtaining a key associated with a cache line;
generating a main hash using a main hash function on the key;
generating an auxiliary hash using an auxiliary hash function on the key;
determining a bucket in a main hash table residing in an external memory using the main hash;
determining an entry in a bucket in an auxiliary hash table residing in an internal memory, using the determined bucket in the main hash table and the auxiliary hash; and
determining the cache line in the main hash table using the determined entry in the auxiliary hash table.

2. The method of claim 1, wherein the internal memory is a cache memory.

3. The method of claim 1, wherein the main hash table comprises a plurality of buckets, wherein each bucket includes a plurality of entries and wherein each entry comprises the key and user data.

4. The method of claim 1, wherein the auxiliary hash table comprises a plurality of buckets, wherein each bucket includes a plurality of entries and wherein each valid entry includes the auxiliary hash corresponding to the key stored in the plurality of buckets of the main hash table.

5. The method of claim 1, wherein the entry in the bucket in the auxiliary hash table comprises a lock status flag.

6. The method of claim 1, wherein the entry in the bucket in the auxiliary hash table comprises a validity flag.

7. The method of claim 1, wherein the key is of an order of 128 bits and wherein the auxiliary hash is of an order of 4 or 6 bits.

8. The method of claim 1, wherein determining the entry in the bucket in the auxiliary hash table, comprises:
comparing the auxiliary hash with at least a portion of the contents stored in each entry of the bucket in the auxiliary hash table; and determining an entry with the at least a portion of the contents matching with the auxiliary hash.

9. The method of claim 8, further comprising:
if there is no entry in the auxiliary hash table with the at least a portion of the contents matching with the auxiliary hash, determining a vacant entry in the corresponding main hash table bucket.

10. The method of claim 9, further comprising:
storing the main hash in the vacant entry in the main hash table; and
storing the auxiliary hash in a vacant entry in the auxiliary hash table.

11. The method of claim 1, wherein obtaining a key associated with a cache line comprises:
obtaining a key associated with a destination address in a packet, wherein the destination address is associated with a network port.

12. The method of claim 11, wherein determining the cache line in the main hash table using the determined entry in the auxiliary hash table comprises:
determining an associated entry in the main hash table using the determined entry in the auxiliary hash table; and determining the network port using the determined associated entry in the main hash table.

13. A network switch, comprising:
a processor; wherein the processor includes a packet forwarding engine, a memory controller, a table walk system, an internal memory and a control operation system;

a plurality of network ports coupled to the packet forwarding engine; and an external memory operatively coupled to the memory controller, wherein the packet forwarding engine obtains a key associated with a destination address in a packet, wherein the destination address is associated with one of the plurality of network ports, wherein the table walk system generates a main hash using a main hash function on the key, wherein the table walk system generates an auxiliary hash using an auxiliary hash function on the key, wherein the table walk system determines a bucket in a main hash table residing in the external memory using the main hash, wherein the table walk system determines an entry in a bucket in a auxiliary hash table residing in the internal memory using the determined bucket in the main hash table and the auxiliary hash, wherein the table walk system determines an associated entry in the main hash table using the determined entry in the auxiliary hash table, and wherein the table walk system determines the one of the plurality of network ports for forwarding the packet using the determined associated entry in the main hash table.

14. The network switch of claim 13, wherein the table walk system compares the auxiliary hash with at least a portion of the contents stored in each entry of the bucket in the auxiliary hash table, and wherein the table walk system determines an entry with the at least a portion of the contents stored in the entry matching with the auxiliary hash.

15. The network system of claim 14, wherein the table walk system determines a vacant entry in the main hash table in the bucket if there is no entry in the auxiliary hash table with at least a portion of the contents matching with the auxiliary hash.

16. The network switch of claim 15, wherein the control operation system stores the main hash in the vacant entry in the main hash table; and wherein the control operation system stores the auxiliary hash in a vacant entry in the auxiliary hash table.

17. The network switch of claim 13, wherein the main hash table comprises a plurality of buckets, wherein each bucket includes a plurality of entries and wherein each valid entry comprises the key and user data.

18. The network switch of claim 17, wherein the auxiliary hash table comprises a plurality of buckets, wherein each bucket includes a plurality of entries and wherein each valid entry includes the auxiliary hash corresponding to the key stored in the corresponding bucket of the main hash table.

19. The network switch of claim 13, wherein the entry in the bucket in the auxiliary hash table comprises a lock status flag.

20. The network switch of claim 13, wherein the entry in the bucket in the auxiliary hash table comprises a validity flag.

21. The network switch of claim 13, wherein the key is of an order of 128 bits and wherein the auxiliary hash is of an order of 4 or 6 bits.

22. A non-transitory computer-readable storage medium for determining a cache line in an N-way set associative cache, having instructions that, when executed by a computing device cause the computing device to:

obtain a key associated with a cache line;

generate a main hash using a main hash function on the key;

generate an auxiliary hash using an auxiliary hash function on the key;

determine a bucket in a main hash table residing in an external memory using the main hash;

determine an entry in a bucket in an auxiliary hash table residing in an internal memory, using the determined bucket in the main hash table and the auxiliary hash; and determine the cache line in the main hash table using the determined entry in the auxiliary hash table.

23. The non-transitory computer-readable storage medium of claim 22, wherein obtaining a key associated with a cache line comprises:

obtaining a key associated with a destination address in a packet, wherein the destination address is associated with a network port.

24. The non-transitory computer-readable storage medium of claim 23, wherein determining the cache line in the main hash table using the determined entry in the auxiliary hash table comprises:

determining an associated entry in the main hash table using the determined entry in the auxiliary hash table; and determining the network port using the determined associated entry in the main hash table.

* * * * *